(12) United States Patent
Hessling et al.

(10) Patent No.: US 8,979,327 B2
(45) Date of Patent: Mar. 17, 2015

(54) SPOTLIGHT

(71) Applicant: Auer Lighting GmbH, Ban Gandersheim (DE)

(72) Inventors: Thomas Hessling, Bad Gandersheim (DE); Marc C. Huebner, Einbeck (DE)

(73) Assignee: Auer Lighting GmbH, Bad Gandersheim (DE)

( * ) Notice: Subject to any disclaimer, the term of this patent is extended or adjusted under 35 U.S.C. 154(b) by 0 days.

(21) Appl. No.: 13/627,102

(22) Filed: Sep. 26, 2012

(65) Prior Publication Data

US 2013/0083542 A1    Apr. 4, 2013

(30) Foreign Application Priority Data

Sep. 30, 2011  (DE) .......................... 10 2011 115 756

(51) Int. Cl.
*F21V 5/04* (2006.01)
*G02B 3/08* (2006.01)
*F21W 131/406* (2006.01)

(52) U.S. Cl.
CPC . *F21V 5/045* (2013.01); *G02B 3/08* (2013.01); *F21W 2131/406* (2013.01)
USPC ................................. 362/311.12; 362/311.15

(58) Field of Classification Search
CPC ............. F21V 5/045; F21V 5/04; G02B 3/08; G02B 5/1876; F21W 2131/406; G02C 2202/20

USPC ........................................ 362/311.12, 311.15
See application file for complete search history.

(56) References Cited

U.S. PATENT DOCUMENTS

| 2,315,721 | A | * | 4/1943 | Martin ........................... 428/602 |
| 3,712,707 | A | * | 1/1973 | Henkes, Jr. .................... 359/448 |
| 4,456,344 | A | * | 6/1984 | Bordignon ..................... 359/742 |
| 4,823,246 | A | * | 4/1989 | Dilouya ........................ 362/328 |
| 5,138,495 | A | * | 8/1992 | Shiono et al. ................. 359/742 |
| 2002/0114160 | A1 | * | 8/2002 | Weigert et al. ................ 362/277 |
| 2004/0021944 | A1 | * | 2/2004 | Kim et al. ..................... 359/558 |
| 2005/0162750 | A1 | * | 7/2005 | Kittelmann et al. .......... 359/636 |
| 2005/0185300 | A1 | * | 8/2005 | Kittelmann et al. .......... 359/742 |
| 2006/0056185 | A1 | * | 3/2006 | Morino et al. ................ 362/332 |

FOREIGN PATENT DOCUMENTS

| DE | 69103707 | 4/1995 |
| EP | 0468410 | 1/1992 |

* cited by examiner

*Primary Examiner* — Andrew Coughlin
(74) *Attorney, Agent, or Firm* — Whitham Curtis Christofferson & Cook, PC (57) ABSTRACT

The invention relates to a spotlight, in particular for at least partially illuminating a stage, wherein the spotlight comprises
  a housing for accommodating a light source and
  a lens,
    through which light emitted by the light source can leave the housing when the light source is accommodated in the housing and
    which is a Fresnel step lens,
which is characterized in that the Fresnel step lens has at least one spiral step on at least one side.

10 Claims, 10 Drawing Sheets

SPOTLIGHT

BACKGROUND OF THE INVENTION

1. Field of the Invention

The invention relates to a spotlight, in particular for at least partially illuminating a stage, wherein the spotlight comprises a housing for accommodating a light source and a Fresnel step lens, through which light emitted by the light source can leave the housing when the light source is accommodated in the housing.

2. Background of the Invention

Such spotlights are used nowadays, for example, for illuminating stages. A sufficiently intense light source which can be a gas discharge lamp or a halogen lamp, for example, is arranged in a housing provided for this purpose. The use of LEDs is also conceivable. The housing is usually nontransmissive to light apart from an opening covered by the lens and is possibly equipped with reflectors in the interior. The aim is to direct as much of the light emitted by the light source onto the area to be illuminated as possible. For this purpose, use is made of a lens which focuses the light emitted by the light source. In this context, the use of a Fresnel step lens here has been known for some time. This type of lens is particularly advantageous in the case of large and in particular thick lenses which therefore have a short focal length in comparison with their size. A short focal length is expedient for the application in a spotlight in order to be able to keep the physical dimensions of the spotlight as small as possible. The light source needs to be arranged in the vicinity of the focal point of the lens used, with the result that a short focal length results in a physically short spotlight.

However, this results in an increased thickness of the lens. In order in this case to be able to save weight and material, a Fresnel step lens is used instead of a normal lens. In the case of such a lens, the glass body is divided into ring-shaped regions, in which the thickness is reduced individually, with the result that a Fresnel step lens has a large number of ring-shaped steps. However, the lens retains its focal length and therefore its essential optical property. However, the imaging quality is generally impaired by the step structure in comparison with a lens consisting of a solid material.

In principle, Fresnel step lenses can have steps on both sides or else only on one side. In most applications today, preferably Fresnel step lenses with steps on one side are used since they can be manufactured more easily and also have optical advantages. In this case, in particular that side of the lens which is remote from the light source is provided with steps, while the inner side, i.e. that which faces the light source arranged in the interior of the housing, is smooth. If steps are also provided on that side of the lenses which faces the light source, this results in a reduction in the efficiency of the lens.

With such a spotlight, a light spot with a specific shape, for example a circular shape, which has a homogeneous brightness distribution is intended to be achieved. For this purpose, that side of the lens which faces the light source is generally roughened, which is conventionally referred to as stippling. This can take place as early as during the pressing operation of the lens, for example, or by means of subsequent sandblasting of a surface which is initially pressed smooth.

In the case without such stippling, it would be possible for the light-emitting means of the light source, for example the filaments of a halogen lamp, to be imaged with high definition in the imaging plane if it is located at a distance in front of the lens that is slightly greater than the focal length of the lens. This would result in optical imaging of the contour of the illuminating part of the light-emitting means in the viewed plane which has greater or less definition being produced instead of the desired round light spot for illuminating a region on a stage. This is disruptive and undesirable.

In order to avoid this, the Fresnel step lenses used in spotlights are roughened on the smooth surface in such a way that precise focusing and therefore high-definition imaging is no longer possible. In the case of a so-called profile spotlight, initially an intermediate image is generated in the spotlight, which is limited in terms of its lateral extent there with the aid of a usually circular intermediate diaphragm, in particular an adjustable iris diaphragm, and is then projected as a circular light spot with a very sharp edge in the stage region in the imaging plane.

One disadvantage with the stippling is, however, that an additional working step in the form of a subsequent sandblasting process is required for this purpose or the stamping part in question is given a corresponding stippled surface contour during pressing of the lens. In this case, the surface roughness should also not be too great since the rays of light should only be deflected slightly. Otherwise, the light scattering at the roughened surface would be so great in terms of its effect that the lens would lose efficiency overall. This loss in efficiency is particularly pronounced since the stippling is located on that side of the lens through which radiation passes first, i.e. the side facing the light source. As it passes through this roughened surface, the light is scattered to such an extent that, to a small extent, said light no longer emerges on the other side of the Fresnel step lens or reaches the steps. Instead, the light enters the region of the steep flanks and the very rounded transition region between the step faces and the flank faces. This light is broken away in an uncontrolled manner in a wide variety of directions and no longer makes a contribution in the region of the desired light field on the stage. This effect is greater the greater the stippling.

SUMMARY OF THE INVENTION

The invention is therefore based on the object of proposing a spotlight in which, using simple means, the light spot on the region to be illuminated has a brightness which is as homogeneous as possible and in addition the luminous efficacy is increased.

The invention achieves the stated object by virtue of a spotlight of the generic type which is characterized by the fact that the Fresnel step lens has at least one spiral step on at least one side.

Therefore, instead of using a conventional Fresnel step lens which has a plurality of concentrically arranged steps, according to the invention, a Fresnel step lens is used which has at least one spiral step. In this way, the required stippling on the flat unstepped side can surprisingly be reduced at least partially. In particular embodiments, this stippling can even be dispensed with entirely. Therefore, the lens can be manufactured more easily, as a result of which the manufacturing costs of the lens and therefore of the spotlight are also reduced, in addition to the amount of time involved. In addition, the losses of efficiency as a result of the stippling on that side of the lens which faces the light source are eliminated or at least reduced, with the result that a greater proportion of the light emitted by the light source is directed onto the region to be illuminated of a stage, for example.

Spiral Fresnel step lenses have long been known from the prior art. For example, U.S. Pat. No. 2,315,721 has already proposed such a spiral step lens. Said spiral step lens is used in conjunction with the process of so-called rear projection which was conventional at that time in the film industry. In this case, the image of a landscape is projected from the rear onto a semi-transmissive shield with a high level of scattering. The actors acting in front of this shield are filmed with the background image, with the result that it has the appearance of the actors acting in the scene itself. For this purpose, both step lenses with concentric rings and spiral structures were used. However, reference is made to the fact that a Fresnel step lens with a plurality of concentric steps has better properties and only a tightly wound spiral comes very close to the desired arrangement of concentric rings.

Spiral Fresnel step lenses are also used in so-called solar concentrators, as are used in the field of photovoltaics, for example. In contrast to the use described here in a spotlight, however, solar concentrators are dependent on a collecting capacity which is as high as possible since the Fresnel step lenses are used in photovoltaics in order to focus as much sunlight as possible onto as small an area as possible. A distribution of the brightness of the light which is as homogeneous as possible on the illuminated area is therefore undesirable and disruptive in this application.

Surprisingly, the optical properties of a Fresnel step lens with a spiral step are also advantageous for the use in a spotlight in accordance with the present invention. Owing to the use of the spiral at least one step, the light intensity is homogenized over the light spot and the contrast between minima and maxima of the light intensity is decreased.

Advantageously, the lens comprises a plurality of, in particular three, spiral steps on the at least one side. Said steps can have a common point of intersection. In a preferred configuration, this point of intersection is in the centre of the at least one side of the lens. In this case, it is advantageous if the plurality of spiral steps run away from one another at equidistant angular distances. If, therefore, the lens has three spiral steps, for example, there is an angle of 120° between in each case two of said steps at the common point of intersection. Naturally, other configurations with more or fewer spiral steps are also conceivable. In addition, the angle between in each case two adjacent steps does not need to be of equal size.

In a further configuration of a spotlight in accordance with the present invention, no step is provided in a central region of the at least one side of the lens. In this region, which will be referred to below as the central lens, the lens is smooth both on the side facing the light source and on the side facing away from the light source. A plurality of spiral steps can emanate from the central region, with the radially innermost points of said steps being distributed equidistantly over the circumference of the central region. In this case, too, a distribution of the light intensity in the illuminated light spot which is as homogeneous as possible can result.

It has proven to be particularly advantageous that the at least one spiral step runs over a plurality of turns. In this case, the radial distance between the individual turns can be constant. As an alternative to this, the at least one spiral step can also run in a spiral which becomes wider or narrower radially towards the outside. This is dependent on the desired properties of the light spot and the spotlight.

Preferably, the lens comprises an outer contour which has a shape which the turns of the at least one spiral step follow. Such a shape can be, for example, oval or polygonal or naturally also circular. It is conceivable, for example, to insert an oval lens into a spotlight which has at least one spiral step, wherein the spiral is likewise oval. In this case, it is possible, for example, to design the distance between two successive turns of the spiral step to be shorter in the direction of the short half-axis of the oval than along the long half-axis of the oval.

In order to further improve the homogenization of the light spot caused by the spotlight, it is advantageous to provide a roughened portion or stippled portion on that side of the Fresnel step lens which does not have any steps and in particular does not have any spiral steps.

BRIEF DESCRIPTION OF THE DRAWINGS

An exemplary embodiment of the present invention will be explained in more detail with reference to a drawing, in which.

DETAILED DESCRIPTION

Different lens shapes for a spotlight of the generic type are simulated below. In this case, the brightness distribution or a section through the brightness distribution is given for various lens shapes.

In order to calculate the resulting imaging properties of the individual lenses, a specific type of halogen lamp with a power of 1000 watts is considered as light-emitting means, as is often used, for example, in spotlights for the stage sector. Such halogen lamps have eight incandescent filaments positioned at close proximity next to one another, said incandescent filaments having a diameter of 0.8 mm, a length of 18 mm and being at a distance of 2 mm from one another. In this way, a light-emitting area of approximately 15 mm×18 mm in extent results. However, this area does not illuminate with uniform brightness, but the individual filaments can clearly be identified in the case of optical imaging.

In the following examples, this flat light-emitting means is located at a distance from the respective Fresnel step lens under consideration that is slightly greater than the focal length thereof. The lenses under consideration have a conventional diameter of 175 mm. The focal length is 85 mm. In the simulations, the light-emitting means in question was always viewed at a distance of 85.73 mm away from the main plane of the lens. Said light-emitting means is therefore 0.73 mm further away from the lens than the focal point thereof. The halogen lamp was in this case positioned on the virtually smooth side of the step lens, as is otherwise conventional in step lens spotlights.

With these specifications, optical imaging on the stepped side of the Fresnel step lens at a distance of 10 m results. In order to assess the optical imaging, a detector size of 2 400 mm×2 400 mm at the given distance of 10 m is assumed in the calculations in order to be able to consider the resulting image of the light-emitting means as a whole. The assumed luminous flux was 25 000 lumens.

As has already been illustrated, in all of the following simulations not that side of the lens which faces the light source has any been provided with roughness or stippling.

Figure 1:
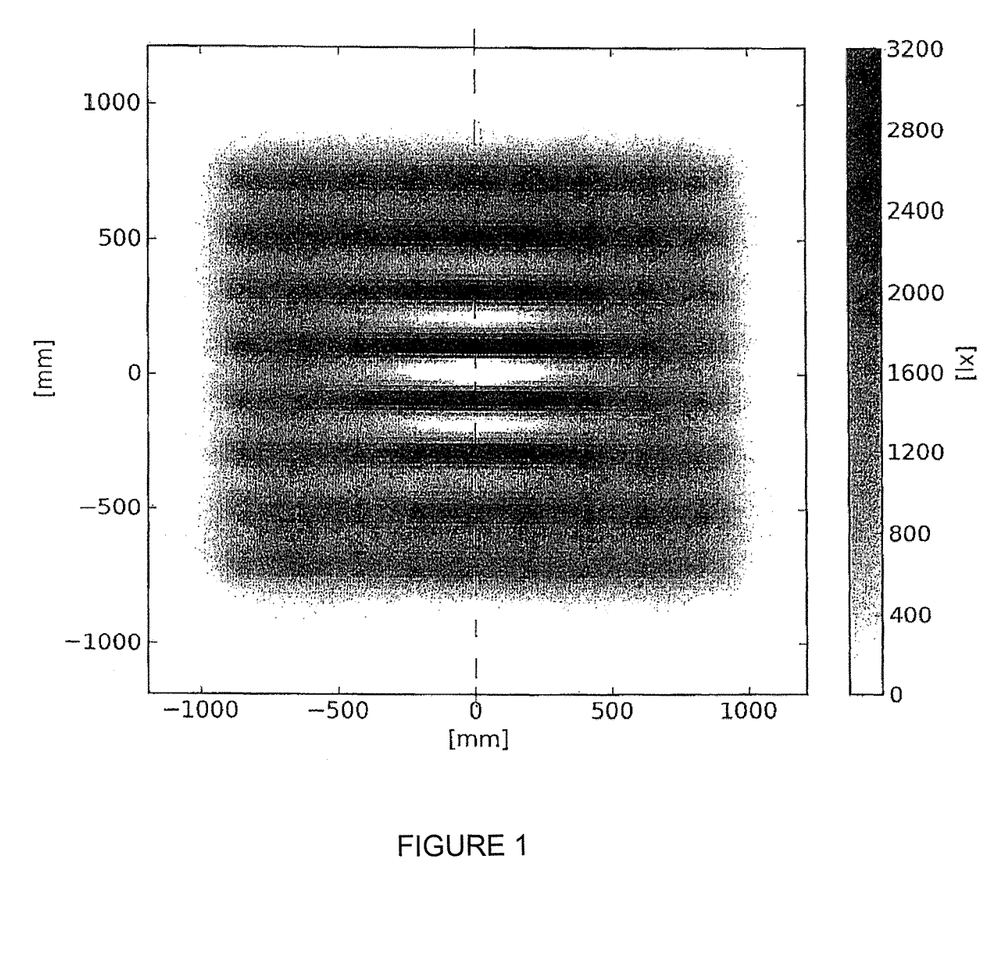
FIG. 1 shows the simulated brightness distribution with a spotlight in accordance with the prior art.

FIG. 1 shows a simulated brightness distribution of a spotlight in accordance with the prior art. Such a spotlight comprises a housing and a Fresnel step lens, which has a plurality of concentric step rings. In this case, that side of the lens which faces the light source is assumed to be smooth and in particular does not have any stippling.

FIG. 1 shows that, with a conventional Fresnel step lens which has a plurality of concentrically arranged steps, the structure of the brightly illuminating incandescent filament can be seen very clearly. The brightness at each location of the detector area is in this case represented in terms of illuminance ([lx]), wherein the illumination is brighter the darker the image in FIG. 1. It can be seen that the contrast in the centre of the detector area is particularly great since here virtually black or virtually white regions are present next to one another with high-definition separation.

Such a result is not surprising since, in this case, a theoretically perfect optical imaging was calculated which was brought about by an idealized step lens with a plurality of concentric step rings. It can be seen from the illustration in FIG. 1 how important the roughening of the smooth unstepped side of a Fresnel step lens is in principle. Without this roughening or stippling, such a lens would not be suitable for illuminating a stage action.

Figure 2:
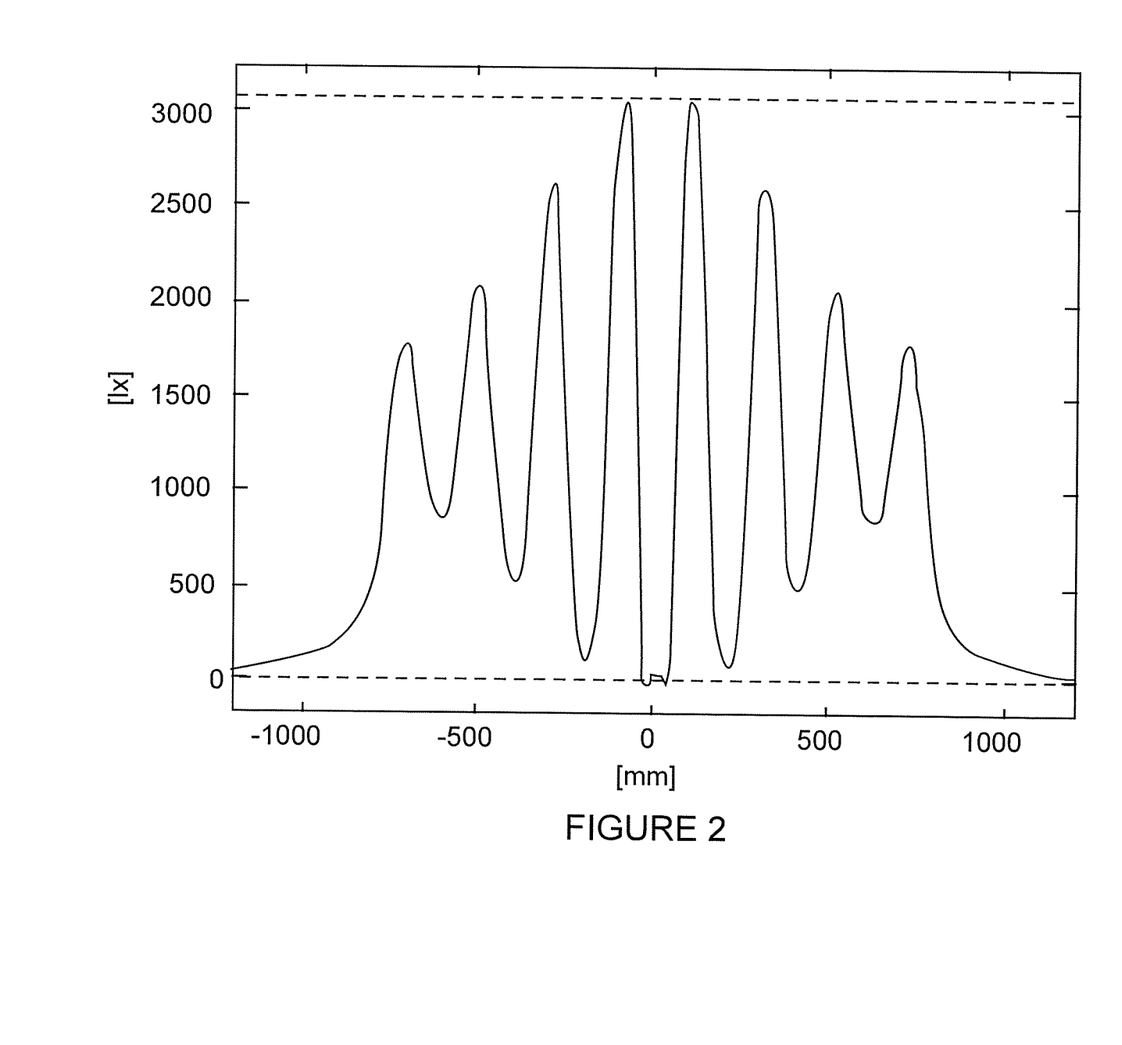
FIG. 2 shows a cross section through the brightness distribution shown in FIG. 1.

FIG. 1 shows a perpendicular dashed line. FIG. 2 shows a section along this line through the brightness profile shown in FIG. 1. A very high contrast is shown in the central region.

In this case, the contrast is calculated from the maximum value of the illuminance and the minimum value for the illuminance of the detector area. It results from Contrast=(maximum value−minimum value)/(maximum value+minimum value).

Since, as can be seen in FIG. 2, the minimum value falls to zero, the contrast in the exemplary embodiment illustrated in FIGS. 1 and 2 is 1.

Figure 3:
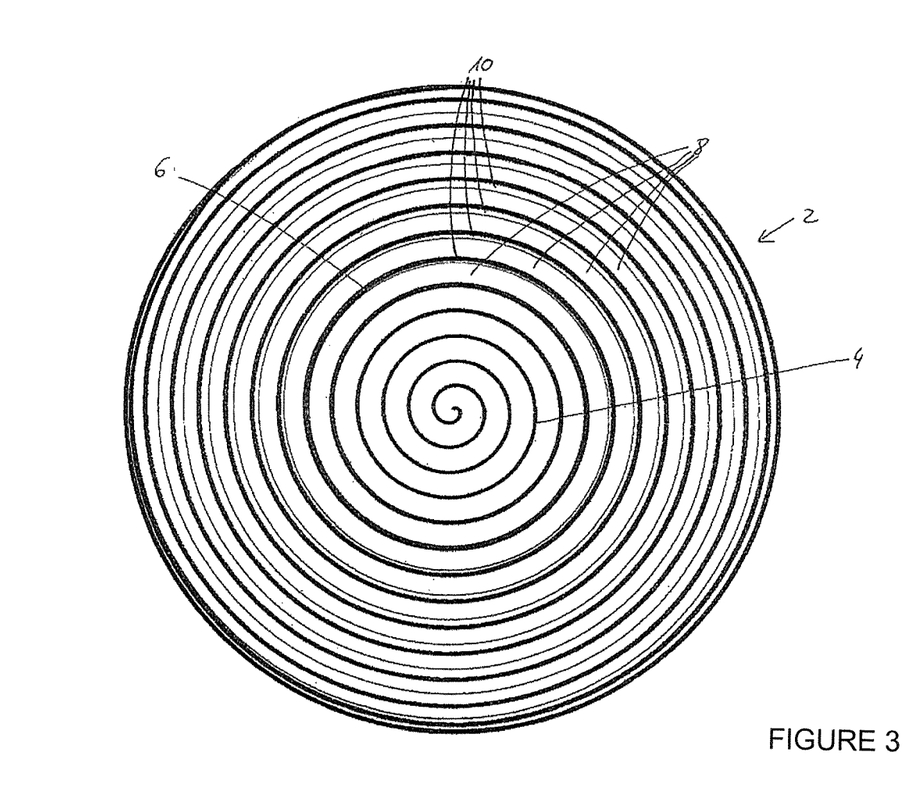
FIG. 3 shows a lens for a spotlight in accordance with a first exemplary embodiment of the present invention.

FIG. 3 shows a plan view of a Fresnel step lens 2 for a spotlight in accordance with a first embodiment of the present invention. Said lens has a spiral step 4, which begins at the centre point of the lens area and extends outwards in a plurality of turns. In this case, the spiral line which represents the step 4 represents the edge region, visible from above, of the spiral step 4. This increases in width, as can already be seen after a few turns. This is because in the plan view shown, the flank regions which are between the individual step regions become markedly more visible. The more the spiral step 4 winds outwards, the greater the angle of the steps relative to the viewer of the plan view shown here. From a separation point 6 in the sixth turn on, not only the optically effective portion 8 of the spiral step 4, but also the optically ineffective portion 10 are illustrated in FIG. 3 as well. It can be seen that the optically ineffective portion 10 of the spiral step 4 becomes thicker radially outwards. However, this does not mean that the outer region of the lens is optically less effective. Instead, it is necessary to consider that, in the intended application of the Fresnel step lens 2 shown, the light-emitting means is located on the unstepped, virtually smooth side of the Fresnel step lens 2, i.e. on the side facing away from the viewer in FIG. 3. The light which comes from there from a position in the vicinity of the focal point, does not meet the flanks coming from this side since the step shape and the flank shape necessarily associated therewith of the spiral step 4 have been calculated precisely such that the flanks in the ideal case are not visible for the light.

Figure 4:
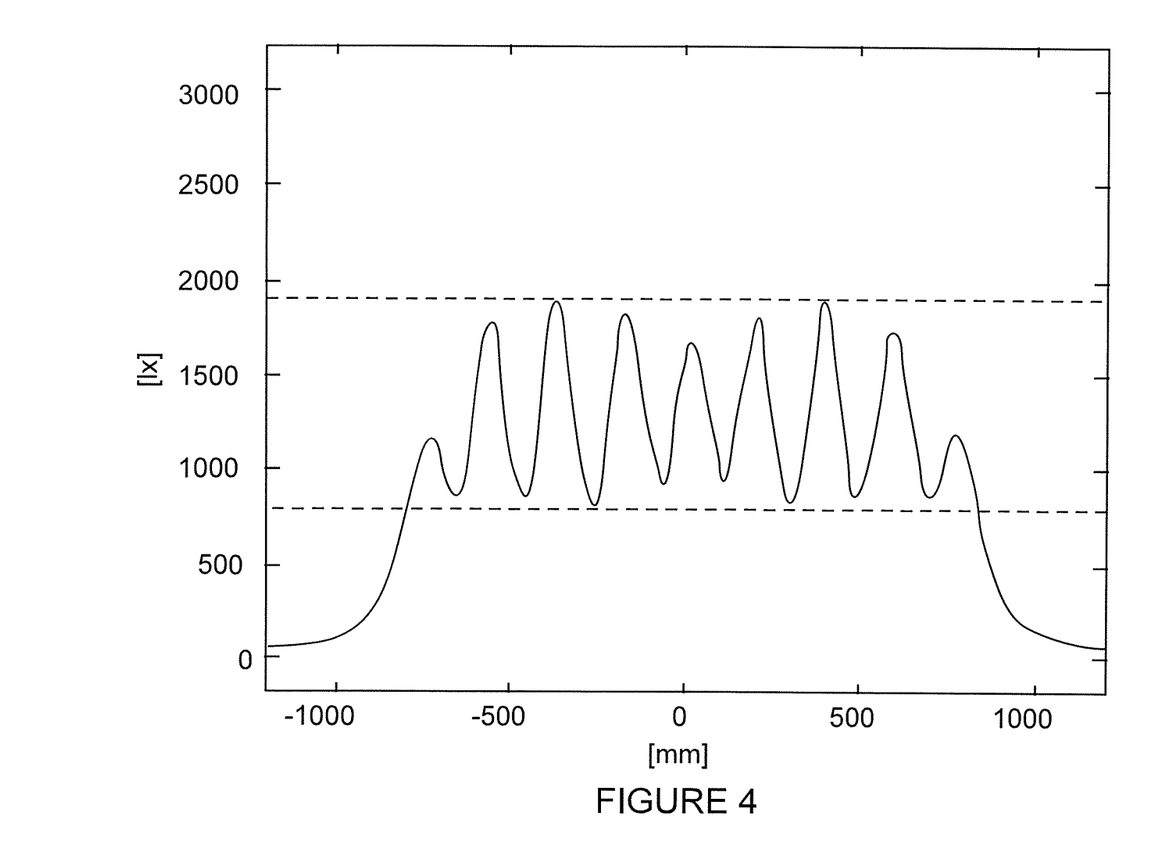
FIG. 4 shows the illustration shown in FIG. 2 for a spotlight in accordance with an exemplary embodiment of the present invention.

FIG. 4 shows a section through the simulated illumination of the illumination area with a spotlight which contains the Fresnel step lens 2 shown in FIG. 3. In comparison with FIG. 2, it is evident that the curved profile is much more uniform since both the very high peaks and the very pronounced dips in the illuminance no longer occur. The contrast which is calculated in accordance with the above formula results in this case at 0.42 and is therefore less than half as pronounced as in the case of the conventional step lens.

In order to achieve a completely homogeneous light distribution on the illumination area with a spotlight with the Fresnel step lens 2 shown in FIG. 3, the stippling provided for the scattering on that side of the lens which faces the light source needs to be markedly less pronounced than in the case of a conventional Fresnel step lens 2, which comprises a plurality of concentrically arranged steps. Therefore, the stippling on the flat side can be much less pronounced than in the case of the conventional step lens, as a result of which the losses resulting from the stippling are naturally also reduced and therefore the efficiency of the lens is increased. Therefore, a spotlight which contains the Fresnel step lens 2 shown in FIG. 3 achieves a higher luminous efficacy and therefore a higher brightness than a spotlight with a conventional Fresnel step lens 2. In addition, no additional and complex working step is required for producing complex stippling on the rear side of the Fresnel step lens 2 which faces the light source.

Figure 5:
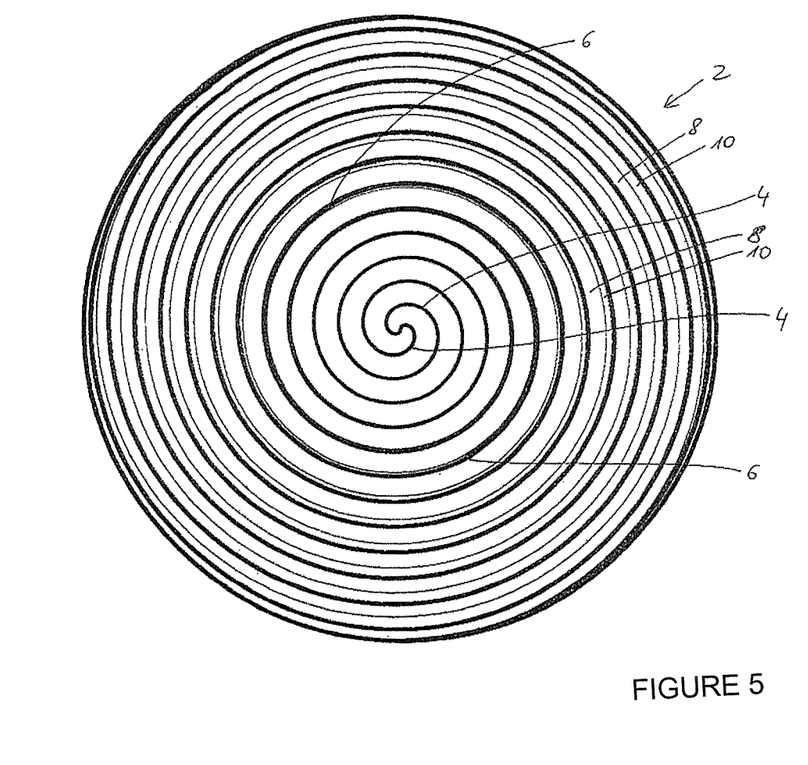
FIG. 5 shows the schematic plan view of a lens for a spotlight in accordance with a second exemplary embodiment of the present invention.

FIG. 5 shows the plan view of the Fresnel step lens 2 for a spotlight in accordance with a further exemplary embodiment of the present invention. The Fresnel step lens 2 shown in FIG. 5 has two spiral steps 4, which meet in the centre of the lens area and extend from there outwards in a plurality of turns. In this case, too, the optically ineffective portion 10 is always wider in comparison with the optically effective portion 8 in the outer region which results from the abovementioned circumstances.

Figure 6:
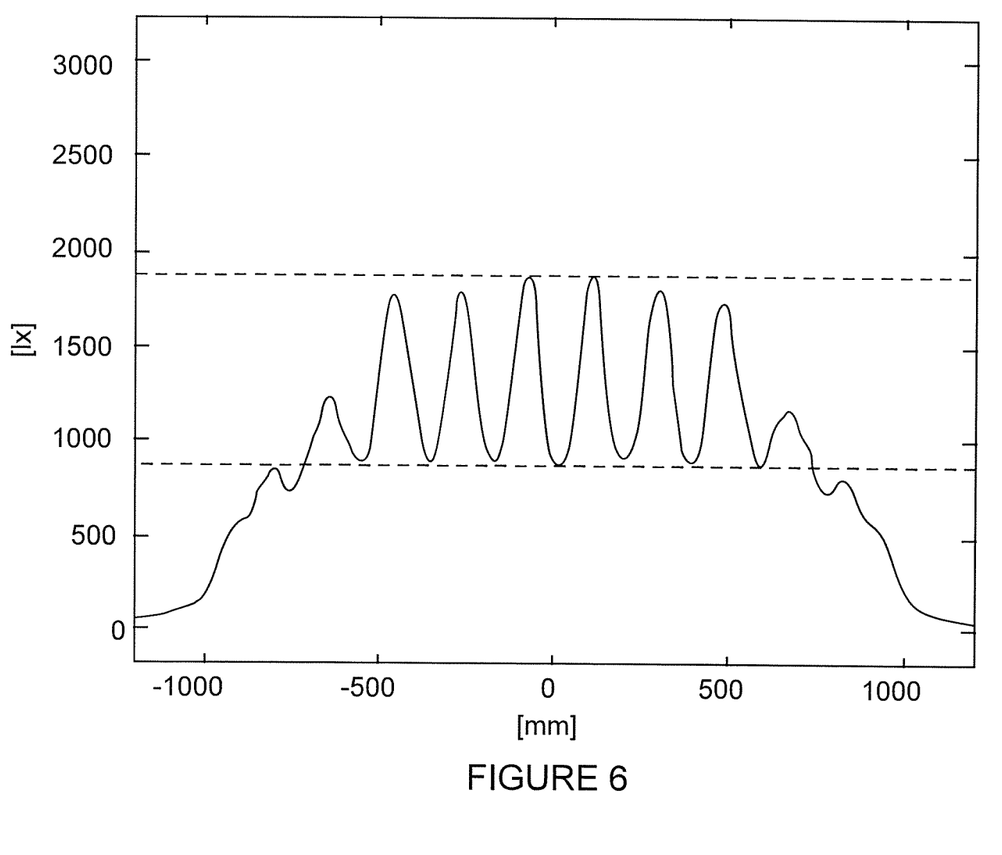
FIG. 6 shows the illustration shown in FIGS. 2 and 4 for a headlamp with a lens as shown in FIG. 5.

FIG. 6 again shows a section through a simulated illumination pattern in which a spotlight has been simulated which contains the Fresnel step lens 2 shown in FIG. 5. In comparison with FIG. 3, it can be seen that the fluctuation level of the individual peaks is slightly reduced. The contrast in accordance with the above formula results at 0.38. In comparison with the contrast of 0.42 in the illustration in FIG. 4, this only results in a very small difference. The entire curve profile of the curves shown in FIG. 6 and FIG. 4 is also relatively similar even when the illuminance is noticeably higher than in the case of a spotlight with a Fresnel step lens 2 as shown in FIG. 3 in the two edge regions of the detector area, at approximately ±900 mm, for example.

Figure 7:
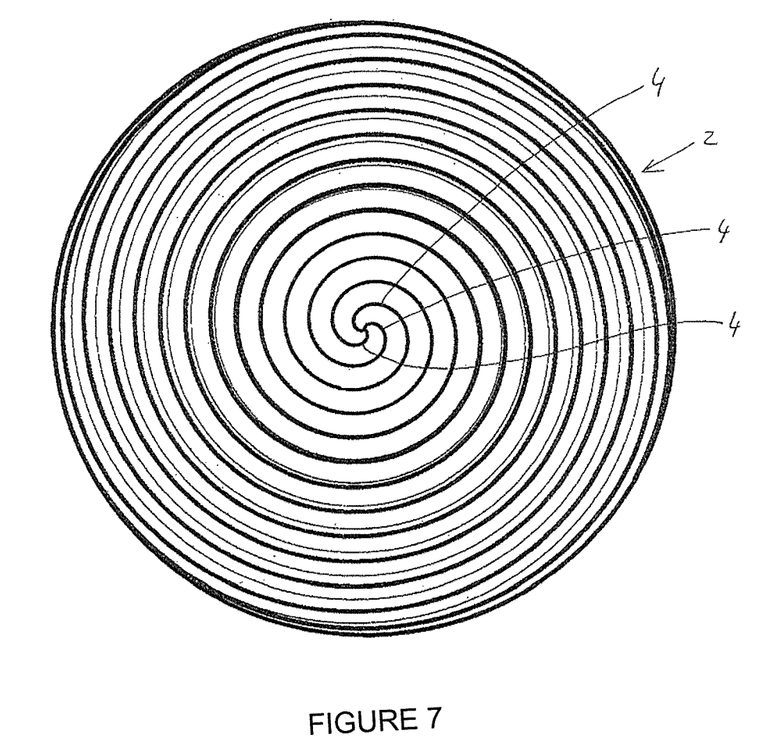
FIG. 7 shows the schematic plan view of a lens for a spotlight in accordance with a further exemplary embodiment of the present invention.

FIG. 7 shows the plan view of the Fresnel step lens 2 for a spotlight in accordance with a third exemplary embodiment of the present invention. It differs from the illustrations shown in FIGS. 3 and 5 in that the Fresnel step lens 2 shown in FIG. 7 has three spiral steps 4, which meet at the centre point of the lens area.

Figure 8:
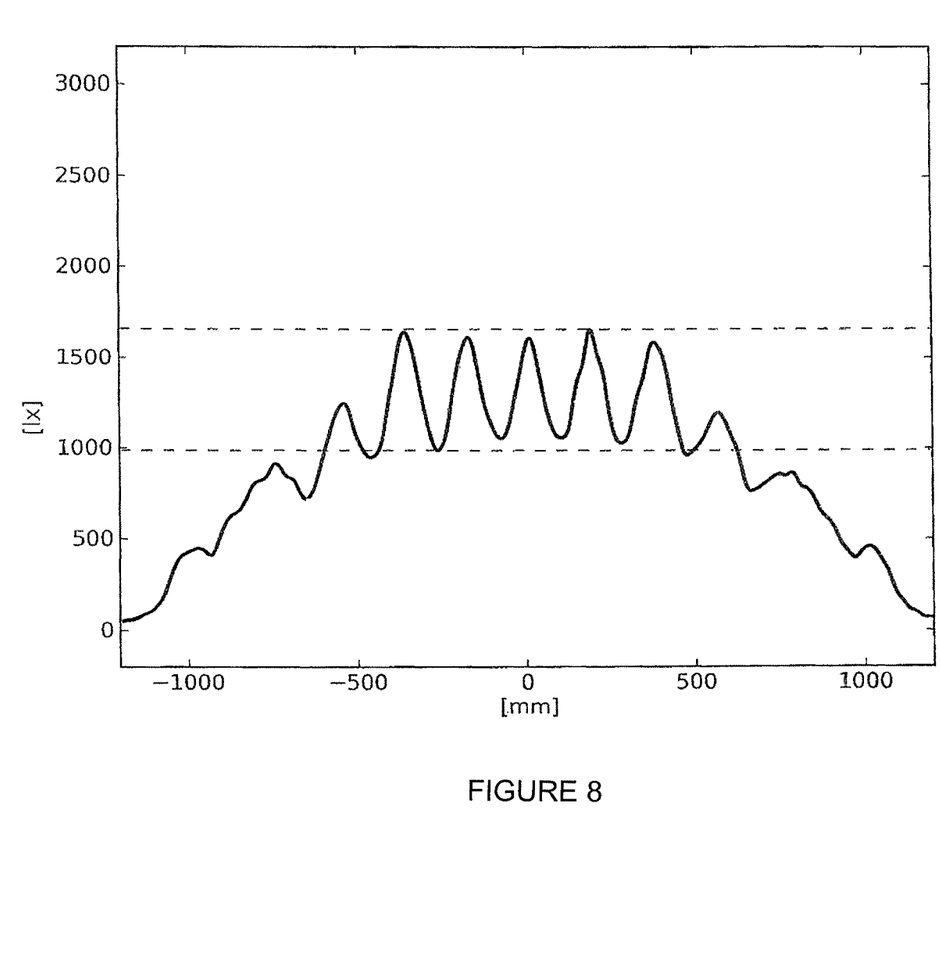
FIG. 8 shows the illustration shown in FIGS. 2, 4 and 6 for a spotlight with a lens as shown in FIG. 7.

FIG. 8 shows a section through the illuminance resulting therefrom. The fluctuation level of the individual peaks is markedly reduced in comparison with the illustrations shown in FIGS. 4 and 6. A calculation of the contrast results in a value of 0.25, which is therefor markedly below the two previous contrast values. For complete homogenization of the illumination of the illumination area with a spotlight with the Fresnel step lens 2 shown in FIG. 7, only a very small amount of stippling, if any at all, is therefore required on that side of the Fresnel step lens 2 which faces the light source. This means that now only a very small proportion of the rays of light is incident on the optically ineffective flank regions of the three spiral steps 4, with the result that the proportion of the lost light is also markedly reduced. Such a triple spiral lens, as is illustrated in FIG. 7, therefore has greater efficiency than the single or double spiral lens in FIGS. 3 and 5. However, this is easily at the cost of contour definitions since the distribution of the illuminance in each addition spiral is widened easily.

However, in the case of the conventional Fresnel step lens 2 with concentrically running steps, a reduction in the efficiency and a marked widening of the illuminated area is achieved owing to the required stippling and roughening of the side facing the light source.

It can therefore be established that, surprisingly, the Fresnel step lens 2 with at least one spiral step 4 has the advantage that, overall, it can produce greater brightness in the desired stage region than a spotlight with a conventional Fresnel step lens 2 comprising a plurality of individual steps. This advantage is not restricted to the specifically mentioned exemplary embodiments, however. It is therefore conceivable, for example, not to begin the at least one spiral step 4 in the center of the lens. In the case of a plurality of spiral steps 4, said steps also do not need to begin at a common point. It is thus possible, for example, for a small central lens 12 to be located in the center of the Fresnel step lens 2, as is usually the case in conventional step lenses. Emanating from this central lens 12 in which there is no step, the at least one spiral step 4 begins at the edge of said central lens.

Figure 9:
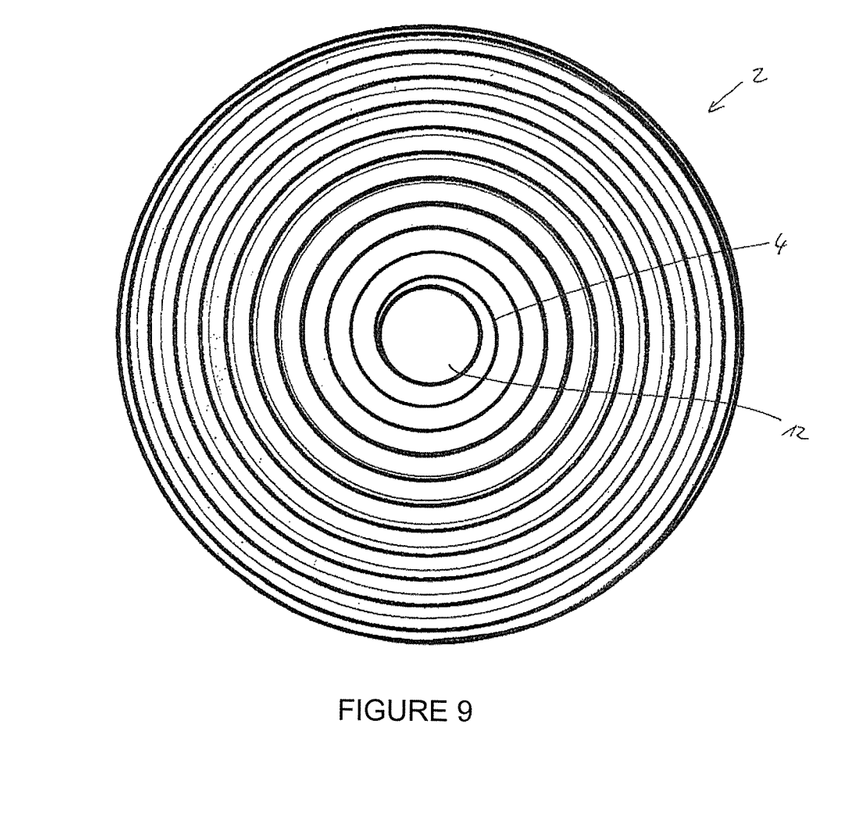
FIG. 9 shows the schematic plan view of a lens for a spotlight in accordance with a further exemplary embodiment of the present invention.

FIG. 9 shows the plan view of the Fresnel step lens 2 in accordance with this embodiment. It has the central lens 12 in the central region, from where the spiral step 4 begins. The central lens 12 itself does not have any steps. As long as the area of the central lines 12 is small in comparison with the total area of the Fresnel step lens 2, this has virtually no effects on the optical imaging properties.

It is naturally also possible for Fresnel step lenses 2 which have the central lens 12 in the center to also have more than only one spiral step 4. It is also not absolutely essential that they wind continuously outwards. Instead, it is also possible for one or more of the spiral steps 4 to split on their path outwards, with the result that, therefore, at least two spiral steps 4 are formed from one spiral step 4 at a specific point in the course of a certain transition region.

In the embodiments shown, it can be seen clearly that the distance between the circulating at least one spiral step 4 and the center point of the Fresnel step lens 2 increases uniformly outwards with each circulation. However, it is also possible and possibly also advantageous for the distance between two adjacent spiral steps 4 to decrease slightly outwards with each turn such that the step width of the at least one spiral step 4 also decreases continually from the inside outwards in the radial direction. This is advantageous when particularly large Fresnel step lenses 2 are intended to be used which have a comparatively short focal length relative to their diameter. In this case, the angled position of the step surface towards the outside increases considerably, as a result of which the flank regions between two adjacent step surfaces would have to be deeper given an equidistant distance between one turn and the next.

The geometry of a lens also does not need to be circular, as illustrated in the figures. The outer contour of a Fresnel step lens 2 can also have an oval or polygonal profile. The use of another light-emitting means than the one simulated here is also conceivable.

Figure 10:
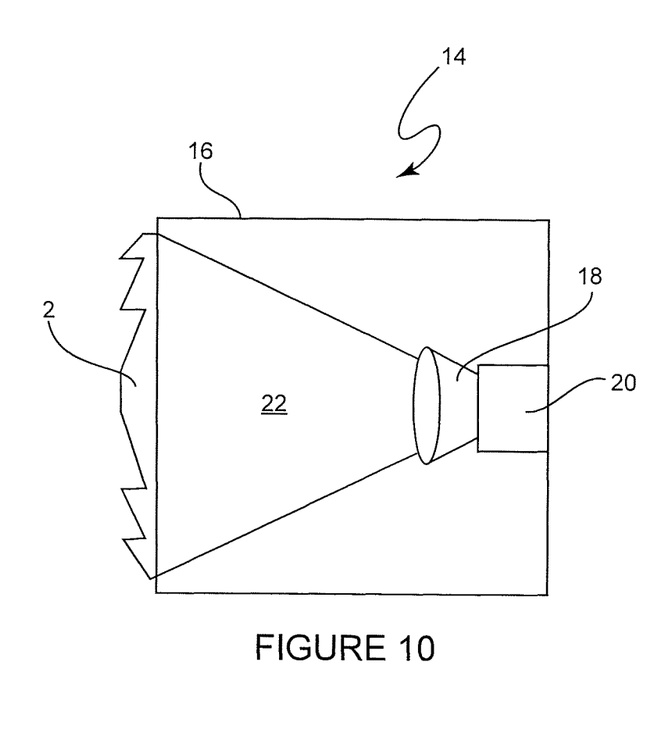
FIG. 10 shows a schematic section through a spotlight in accordance with a further exemplary embodiment of the present invention.

FIG. 10 shows the schematic illustration through a spotlight 14 in accordance with an exemplary embodiment of the present invention. The spotlight comprises a housing 16, with the Fresnel step lens 2 being arranged on one side of said housing, on the left-hand side in FIG. 10. A light source 18, which is arranged on a base 20, via which it is connected to the housing 14, is located in the interior of the housing 14. The light source 18 emits light in a schematically illustrated light cone 22, which light impinges on the Fresnel step lens 2 with the spiral step 4.

The invention claimed is:

1. A spotlight comprising:
a housing for accommodating a light source and a Fresnel step lens,
wherein through the Fresnel step lens light emitted by the light source leaves the housing when the light source is accommodated in the housing,
wherein the Fresnel step lens has a center and an outer rim,
wherein the Fresnel step lens has at least one spiral on a first side which forms a plurality of spiral steps and which begins towards said center and extends outwardly towards said outer rim and wherein flank regions between adjacent individual steps of said plurality of spiral steps increase in size in a radial direction from said center towards said outer rim, and
wherein the Fresnel step lens has a second side facing the light source, said second side is opposite the first side, and
wherein the spotlight is configured for at least partially illuminating a stage.

2. The spotlight according to claim 1, wherein the plurality of spiral steps have a common point of intersection.

3. The spotlight according to claim 1, wherein no step is provided in a central region of the first side of the Fresnel step lens.

4. The spotlight according to claim 3, wherein the plurality of spiral steps emanate from the central region, and wherein the radially innermost points of said steps being distributed equidistantly over the circumference of the central region.

5. The spotlight according to claim 1, wherein a radial distance between the individual turns of said at least one spiral is constant.

6. The spotlight according to claim 1, wherein an outer contour of the Fresnel step lens has a shape which the turns of the at least one spiral step follow.

7. The spotlight according to claim 6, wherein the outer contour of the Fresnel step lens is oval or polygonal.

8. The spotlight according to claim 1, wherein the second side of the Fresnel step lens is a roughened or stippled portion.

9. The spotlight according to claim 1, wherein the second side of the Fresnel step lens is unstepped and smooth.

10. The spotlight according to claim 1, wherein the plurality of spiral steps is three.

\* \* \* \* \*